United States Patent
Huang et al.

(10) Patent No.: US 12,323,790 B2
(45) Date of Patent: Jun. 3, 2025

(54) SECURE ZERO-EXCHANGE PROVISION SYSTEM FOR WIRELESS MESH ACCESS POINTS

(71) Applicant: Hewlett Packard Enterprise Development LP, Houston, TX (US)

(72) Inventors: Jiajun Huang, Beijing (CN); Xiong Zhang, Beijing (CN); Chao Guo, Beijing (CN)

(73) Assignee: Hewlett Packard Enterprise Development LP, Spring, TX (US)

( * ) Notice: Subject to any disclaimer, the term of this patent is extended or adjusted under 35 U.S.C. 154(b) by 334 days.

(21) Appl. No.: 17/902,661

(22) Filed: Sep. 2, 2022

(65) Prior Publication Data

US 2024/0080663 A1 Mar. 7, 2024

(51) Int. Cl.
*H04W 12/04* (2021.01)
*H04W 12/03* (2021.01)
*H04W 12/041* (2021.01)
*H04W 12/0431* (2021.01)

(52) U.S. Cl.
CPC ....... *H04W 12/0431* (2021.01); *H04W 12/03* (2021.01); *H04W 12/041* (2021.01)

(58) Field of Classification Search
CPC H04W 12/03; H04W 12/041; H04W 12/0431
USPC .......................................................... 455/410
See application file for complete search history.

(56) References Cited

U.S. PATENT DOCUMENTS

2020/0145211 A1* 5/2020 Lee ...................... H04L 9/0825

OTHER PUBLICATIONS

Aruba Networks, Inc., "Secure Enterprise Mesh," Chapter 8, ArubaOS 6.1 User Guide, Sep. 1, 2022, <https://web.archive.org/web/20220901225743/https://www.arubanetworks.com/techdocs/ArubaOS_61/ArubaOS_61_UG/Mesh.php#XREF_34254_Provisioning_APs>, 49 pages.
Hewlett Packard Enterprise Development LP, "Securely Connect IoT Devices To In-Building IT Networks", available online at <https://www.arubanetworks.com/assets/so/SO_Device-Provisioning-Protocol.pdf>, Jun. 2022, 3 pages.
Wi-Fi Alliance, "Wi-Fi Easy Connect", available online at <<https://web.archive.org/web/20220516084121/https://www.wi-fi.org/discover-wi-fi/wi-fi-easy-connect>>, May 16, 2022, 6 pages.

* cited by examiner

*Primary Examiner* — Joel Ajayi
(74) *Attorney, Agent, or Firm* — Yao Legal Services, Inc.

(57) ABSTRACT

One aspect provides a system and method for provisioning an access point (AP) in a wireless mesh network. During operation, a controller can obtain a set of published global encryption parameters comprising a master public key, apply an identity-based encryption (IBE) scheme to encrypt a configuration message based at least on the master public key, and transmit the encrypted configuration message to a proxy device, which forwards the encrypted configuration message to the AP. The proxy device is coupled to the controller via a previously established secure communication channel and coupled to the AP via an open communication channel. The AP can decrypt the encrypted configuration message using an AP-specific secret key generated based on a unique identifier of the AP and a master private key corresponding to the master public key, thereby facilitating provisioning of the AP based on the configuration message.

20 Claims, 8 Drawing Sheets

SECURE ZERO-EXCHANGE PROVISION SYSTEM FOR WIRELESS MESH ACCESS POINTS

BACKGROUND

Field

This disclosure is generally related to provisioning wireless mesh access points (APs) in a wireless mesh network.

BRIEF DESCRIPTION OF THE FIGURES

In the figures, like reference numerals refer to the same figure elements.

DETAILED DESCRIPTION

The following description is presented to enable any person skilled in the art to make and use the embodiments and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown but is to be accorded the widest scope consistent with the principles and features disclosed herein.

In a wireless mesh network, the provision and configuration of the access points (APs) can rely on communication channels established between the APs and the network management system (NMS) to transfer messages carrying the provision/configuration parameters (e.g., a mesh service set identifier (SSID)) between the NMS and APs. However, mesh APs typically do not have a wired uplink (e.g., an Ethernet link) connected to the NMS, and the wireless channel between a mesh AP and the NMS is not yet established before or during the initial booting/starting-up of the AP, thus making the initial provision/configuration of the AP a challenge.

If the AP has a wired interface, one existing provisioning approach is to connect the AP to the NMS controller using a cable (e.g., an Ethernet cable), configure the AP via the cabled connection, and then remove the cable to allow the AP to be deployed in the field. This process is time-consuming and cumbersome, especially when a large number of APs need to be deployed. On the other hand, if the mesh AP does not have a wired interface, one existing provisioning approach is to establish an unsecure wireless channel (e.g., a Bluetooth™ channel) between the mesh AP and the NMS controller to allow the mesh AP to download configuration parameters or files via the unsecure channel. This approach brings a security risk because this initial wireless channel is unprotected against attackers. An efficient and secure mechanism is needed for the initial provision and configuration of the mesh APs during the bootup stage. Some aspects of the application can provide a secure mesh-AP-provision mechanism that requires zero message exchanges between the AP and the NMS controller. More specifically, the secure and zero-exchange provisioning of the AP can be enabled by implementing identity-based encryption (IBE) techniques. Using IBE, no key exchange, other than the AP's identity information, is needed. To further improve efficiency, according to some aspects, the NMS controller can use a group encryption key to encrypt a configuration message and send the same encrypted configuration message to multiple APs to allow the multiple APs to be provisioned concurrently.

Figure 1:
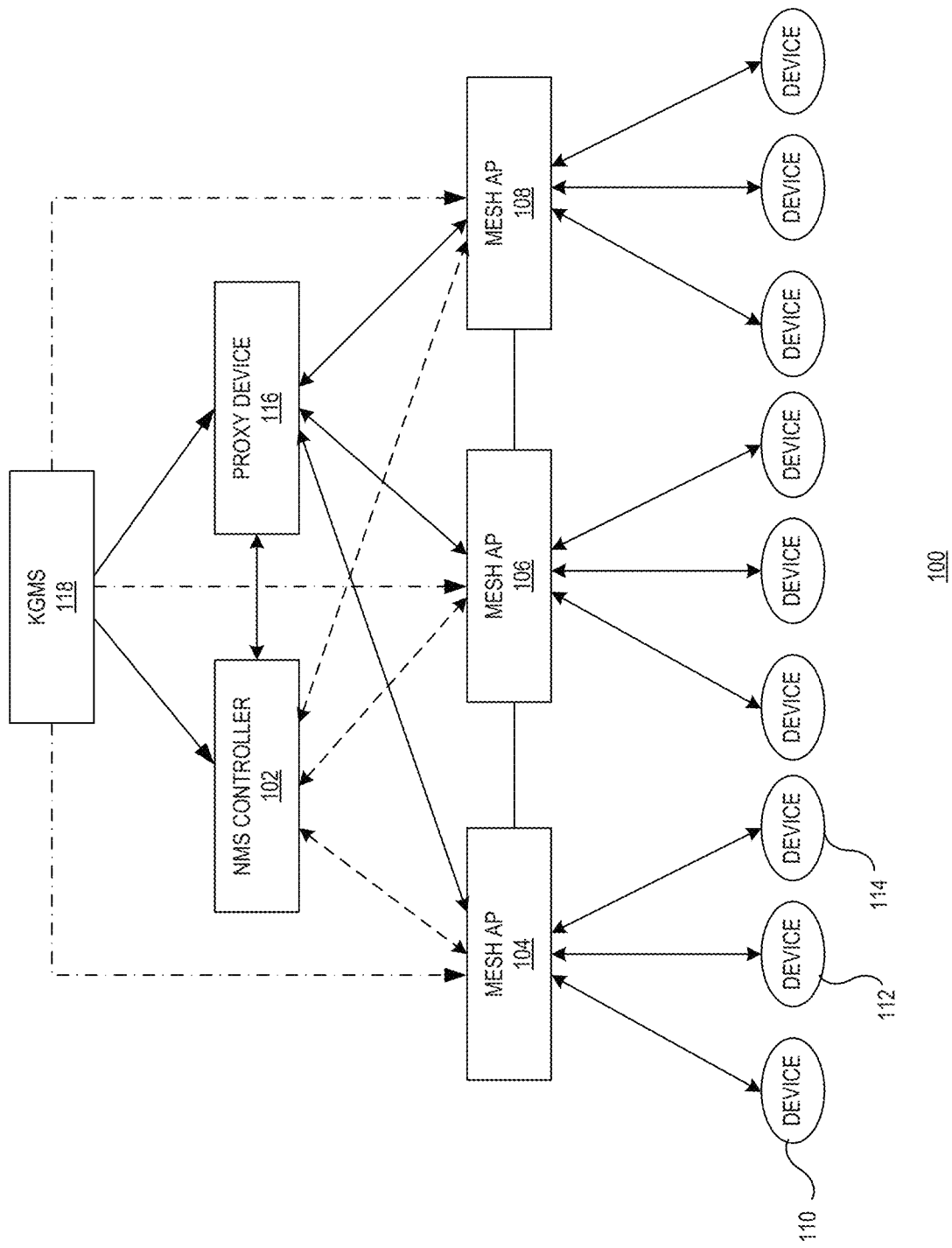
FIG. 1 illustrates a wireless mesh network, according to one aspect of the application.

FIG. 1 illustrates a wireless mesh network, according to one aspect of the application. Wireless mesh network 100 can include an NMS controller 102, a number of mesh access points (APs) (e.g., APs 104, 106, and 108), and a number of mobile devices (e.g., mobile phones, laptop/tablet computers, Internet of Things (IoT) devices, etc.) coupled to the APs. For example, wireless devices 110, 112, and 114 are coupled to mesh AP 104. NMS controller 102 can reside on a mesh portal, which has a wired uplink and can function as a gateway between the wireless mesh network and the enterprise wired local area network (LAN). According to some aspects, NMS controller 102 can be responsible for providing centralized provisioning, configuration, and network management for APs in wireless mesh network 100. In this disclosure, an NMS controller can also be referred to as a mesh controller or simply a controller. A mesh AP (e.g., AP 104, 106, or 108) can be responsible for providing access services to mobile devices coupled to the AP. When the APs are initially deployed, they have not established a secure communication channel to NMS controller 102 (hence, the bi-directional links between NMS controller 102 and the APs are represented using dashed lines). Moreover, a previously connected AP may lose its connection to NMS controller 102 and may need to be re-provisioned or reconfigured.

Wireless mesh network 100 can include a proxy device 116, which can be a device that has already established a secure and trusted connection (which can be a wired or wireless connection) with NMS controller 102. Proxy device 116 can also include a wireless interface allowing it to communicate with mesh APs in network 100 via open communication channels. Proxy device 116 can be any type of networking device. For example, proxy device 116 can be a mesh AP that has been provisioned previously. Proxy device 116 can also be a mobile phone or an IoT device. Proxy device 116 may use various mechanisms to set up the secure and trusted link to NMS controller 102, and the actual mechanism used for setting up such a secure link is beyond the scope of this disclosure. Proxy device 116 can be configured to forward messages (e.g., configuration messages) exchanged between NMS controller 102 and an AP during the bootup stage of the AP. More specifically, proxy device 116 can be configured to forward the messages without processing and alteration of the messages. Note that proxy device 116 should be at least a half-honest node that does not tamper with the messages exchanged between NMS controller 102 and the APs.

Wireless mesh network 100 can also include a key-generation-and-management system (KGMS) 118 responsible for generating and distributing encryption/decryption keys. NMS controller 102 may be coupled to KGMS 118 using a wired or wireless secure channel. KGMS 118 can also use an open public channel to distribute global system parameters (GSP) (e.g., public keys) needed for message encryption/decryption operations. KGMS 118 can also be responsible for generating and distributing a secret key to each AP. According to some aspects, the secret key can be distributed to an AP during its manufacturing process. For example, the secret key can be recorded in the read-only memory (ROM) of the AP to allow a message encryption/decryption unit of the AP to access the secret key.

While booting up, a mesh AP (e.g., AP 104, 106, or 108) can send out, via an open channel, probe requests, which will be forwarded to NMS controller 102 by proxy device 116. NMS controller 102 can then in turn send, via proxy device 116, configuration messages to the AP to allow the AP to be provisioned based on content included in the configuration messages. For security, the configuration messages can be encrypted. According to some aspects, a public-key cryptographic technique can be used, where NMS controller 102 encrypts the configuration messages using a public key and the AP decrypts the encrypted messages using a corresponding private key. However, standard public-key encryption operations require pre-distribution of authenticated keys, and such a process can be inefficient. To improve efficiency, according to some aspects of the application, the configuration messages can be encrypted using an identity-based encryption (IBE) technique, where the encryption keys are generated based on a unique identifier (e.g., a media-access control (MAC) identifier, a manufacturer-assigned serial number, or a user-defined identifier) of the AP.

According to IBE, KGMS 118 can generate a master public-private key pair and publish the master public key. NMS controller 102 can compute an AP-identifier-based public key using the master public key and the unique identifier of a target AP. On the other hand, KGMS 118 computes an AP-identifier-based private key using the master private key and the unique identifier of the target AP. The AP-identifier-based private key (i.e., the secret key) can be pre-recorded in the ROM of the AP. While booting up, the to-be-provisioned AP can include its unique identifier in the probe request messages to make NMS controller 102 aware of the to-be-provisioned AP. In response, NMS controller 102 can encrypt a configuration message using the AP-identifier-based public key corresponding to the AP's identifier and send, via proxy device 116, the encrypted configuration message to the to-be-provisioned AP. The to-be-provisioned AP can in turn use the AP-identifier-based private key pre-recorded in its ROM to decrypt the message to obtain configuration parameters (e.g., the mesh cluster ID, the power and frequency band of the radio, etc.). The AP can subsequently apply the configuration, thus establishing a secure wireless link to NMS controller 102. Such a link can allow NMS controller 102 to send subsequent configuration updates to the AP.

Figure 2:
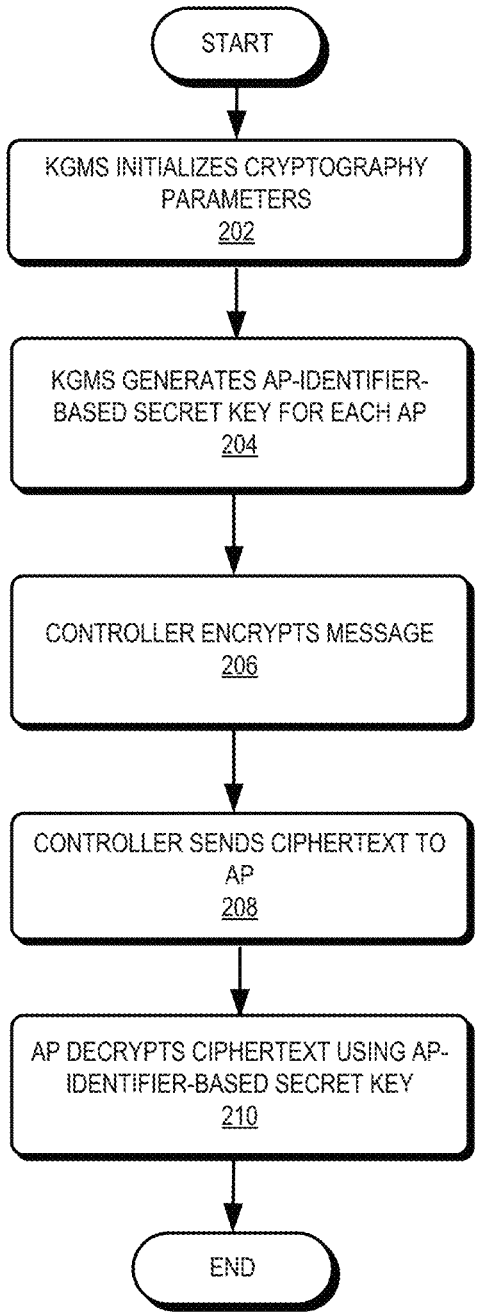
FIG. 2 illustrates a message-encryption/decryption process, according to one aspect of the application.

FIG. 2 illustrates a message-encryption/decryption process, according to one aspect. During operation, the KGMS can initialize cryptographic computing parameters used for subsequent encryption/decryption operations (operation 202). Depending on the actual cryptographic algorithms being implemented, the initial cryptographic computing parameters can also be different.

According to some aspects of the instant application, the IBE scheme can be achieved using elliptic-curve cryptography (ECC) and bilinear pairing computation (BPC) algorithms, both of which have corresponding trapdoor functions and can offer public-key security. According to ECC, given that P,Q are points on an elliptic curve and k is an integer, Q=k×P can be easily computed if P and k are known, whereas it is very difficult to reversely compute k if P,Q are known. According to BPC, for two prime groups $G_1, G_T$ with a primary order q, a bilinear pairing ê is defined as an operation to map two points in group $G_1$ to group $G_T$, where $ê:G_1 \times G_1 \rightarrow G_T$; and the pairing operation for points (P,Q) has a bilinear property, where $ê(\alpha P, bQ) = ê(P,Q)^{\alpha b}$. To implement the ECC and BPC algorithms, the KGMS can initialize the cryptographic computing parameters by selecting the two prime groups, the bilinear pairing method ê, and a pair of hash functions $H_1, H_2$. The initialization process can also include generating a master public-private key pair and publishing the master public key along with other cryptographic computing parameters. The published master public key and the cryptographic computing parameters can also be referred to as global system parameters (GSP). The GSP are distributed to all devices in the network.

Exemplary pseudocode for the initialization process can include:

Init (q):
  $\{G_1, G_T, g, ê(g,g)\} \leftarrow G$//where $G_1$ and $G_T$ are prime q-order multiplicative cyclic groups, g the generator of multiplicative cyclic group $G_1$, and ê the bilinear pairing mapping;
  $g_1 \leftarrow_R G_1$//where $\leftarrow_R$ is a random select operation and $g_1$ is randomly selected from group $G_1$;
  $M_{sk} = s \leftarrow_R Z_p$//where $Z_p$ is a group of integers, s a randomly selected integer from $Z_p$, and $M_{sk}$ the master private key;
  $M_{pk} = g_1^s$//where $M_{pk}$ is the master public key);
  Select: $H_1: \{0,1\}^* \rightarrow G_1$, $H_2: G_T \rightarrow \{0,1\}^n$//where any length string can be hashed to group $G_1$ and elements in group $G_T$ are hashed to strings of length n;
  GSP=$\{q, G_1, G_T, Z_p, g, ê(g,g), n, g_1, M_{pk}, H_1, H_2\}$//global system parameters, including the master public key and cryptographic computing parameters useful for the encryption/decryption operation.

Subsequent to the system initialization, the KGMS can generate the AP-identifier-based secret key for each AP (operation 204). The AP-identifier-based secret key can be generated based on a unique identifier (e.g., a MAC identifier, a manufacturer-assigned serial number, or a user-defined identifier) of the AP and the master private key, and this AP-identifier-based secret key can be written into the AP's ROM during its manufacturing. Note that each AP will have its own AP-identifier-based secret key. Exemplary pseudocode for the key-generation process can include:

KeyGen($AP_{id}$)://where $AP_{id}$ is the unique identifier of the AP
  $Q_{id} = H_1(AP_{id})$//where $Q_{id}$ is the result of hash function $H_1$;
  $SK_{id} = Q_{id}^s$//where $Sk_{id}$ is the AP-identifier-based secret key and $s = M_{sk}$ is the master private key.

To provision a mesh AP, the mesh controller (e.g., an NMS controller) can encrypt a configuration message to be sent to the AP using an AP-identifier-based public key, which is a combination of the master public key and the AP's unique identifier (operation 206). Note that the controller can obtain the identity information of the AP from report messages sent by the proxy device. Alternatively, an administrator may manually enter the AP's identity information. The pseudocode for the message-encryption process is as follows:

Encrypt(M,M$_{pk}$, AP$_{id}$):
$Q_{id}$=H$_1$(AP$_{id}$)∈ G$_1$//compute the hash function;
r←$_R$Z$_p$//randomly select an integer r;
P=ê(Q$_{id}$,M$_{pk}$)$^r$//bilinear pairing, where M$_{pk}$ is the master public key;
CT=(C$_1$,C$_2$)=(g$_1^r$,M⊕H$_2$(P))//where CT denotes the ciphertext, C$_1$ and C$_2$ are two parts of the cipher text, g$_1$ is part of the GSP, M the plaintext message, and ⊕ the XOR operation.

The controller can send the encrypted message (i.e., ciphertext CT) to the AP via the proxy device (operation 208). More specifically, the controller can transmit the encrypted message to the proxy device, which can read the message header and identify the target AP. In response to receiving the encrypted message, the proxy device can forward the encrypted message to the identified target AP. When the target AP receives the encrypted message, it can use its pre-recorded AP-identifier-based secret key SK$_{id}$ to decrypt the ciphertext to obtain the plaintext message (operation 210). Exemplary pseudocode for the ciphertext-decryption process can include:

Decrypt(CT, SK$_{id}$):

$$M' = H_2(ê(SK_{id}, C_1)) \oplus C_2 = H_2(ê(SK_{id}, C_1)) \oplus M \oplus H_2(P)$$
$$= H_2(ê(SK_{id}, C_1)) \oplus M \oplus H_2(ê(Q_{id}, M_{pk})^r)$$
$$= M$$

Note that the message decryption is based on the bilinear property of the pairing operation where ê(SK$_{id}$,C$_1$)= ê(Q$_{id}$,g$_1$)$^{sΠr}$=ê(Q$_{id}$, M$_{pk}$)$^r$.

Figure 3:
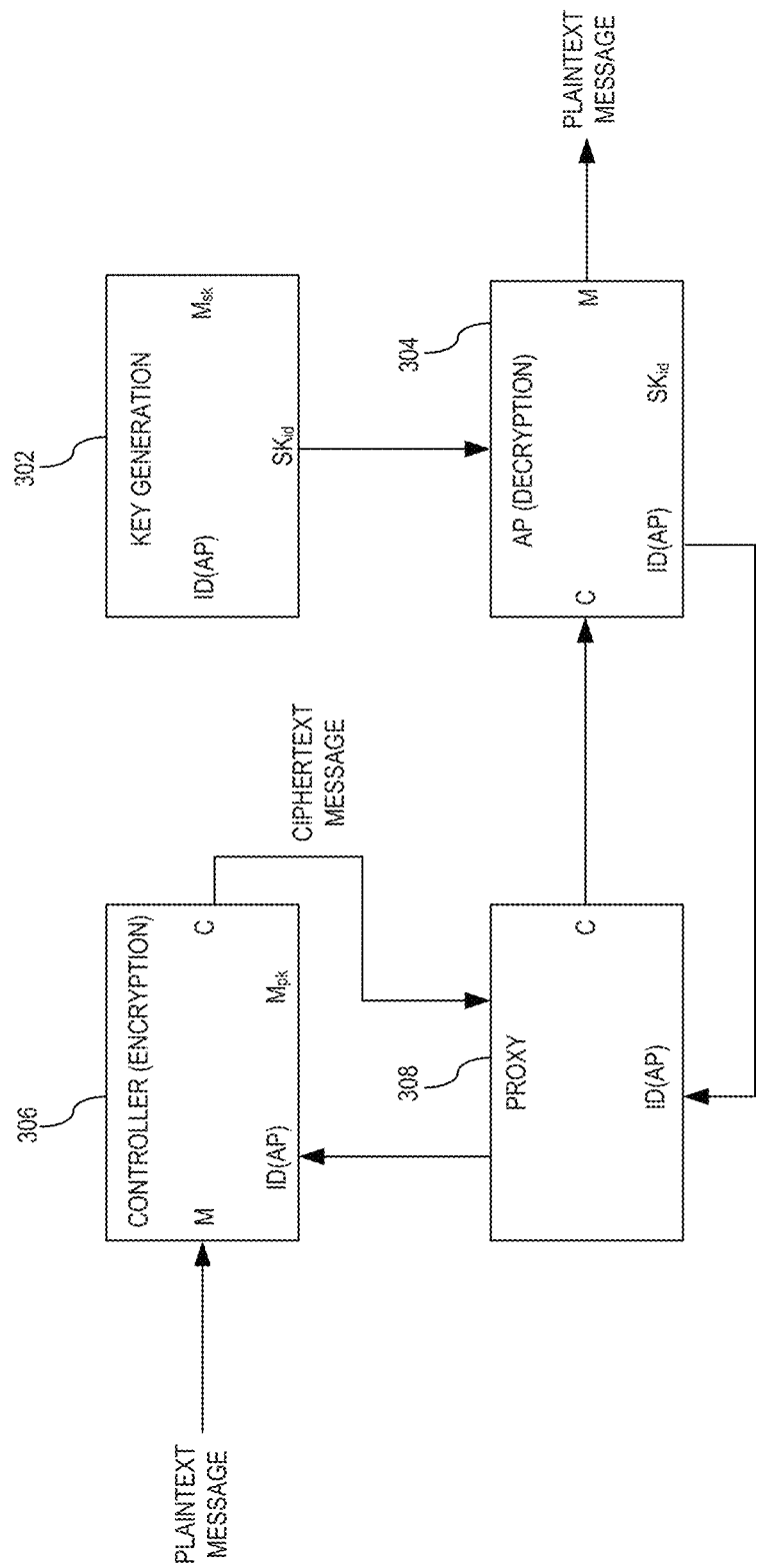
FIG. 3 illustrates a workflow of the identity-based encryption/decryption operation, according to one aspect of the application.

FIG. 3 illustrates a workflow of the identity-based encryption/decryption operation, according to one aspect. In FIG. 3, a KGMS 302 can perform the key-generation operation, which can include generating the AP-identifier-based secret key SK$_{id}$ for each AP. The AP-identifier-based secret key SK$_{id}$ can be generated based on the identity information of the AP and a master private key M$_{sk}$. KGMS 302 can pre-record the AP-identifier-based secret key SK$_{id}$ on each AP. An AP 304 can report its identity information to a controller 306 via a proxy device 308. Using the AP's identity information and a master public key M$_{pk}$, controller 306 can perform an encryption operation on a plaintext message to generate a ciphertext message. Controller 306 can send the ciphertext message to AP 304 via proxy 308. AP 304 can then use its pre-recorded AP-identifier-based secret key SK$_{id}$ to decrypt the ciphertext message to obtain the plaintext message. According to some aspects of the application, the plaintext message can include configuration parameters (e.g., the mesh cluster ID, power and frequency of the radio on the AP, etc.). AP 304 can be provisioned according to these configuration parameters. Once provisioned, AP 304 can directly communicate with controller 306. For example, AP 304 can receive updated configuration from controller 306.

As can be seen from FIG. 3, the encryption/decryption operation involves four entities, the KGMS for key generation and distribution, the controller for encrypting the message, the AP for decrypting the message, and the proxy for facilitating message exchange between the AP and the controller. Other than message forwarding, the proxy does not perform any actual encryption/decryption operations.

The communication between an AP and the proxy device can be established through a process similar to the IEEE standard 802.11 association process. After the association between the proxy device and the AP is achieved, the proxy device can forward the ciphertext message from the controller to the AP.

Figure 4:
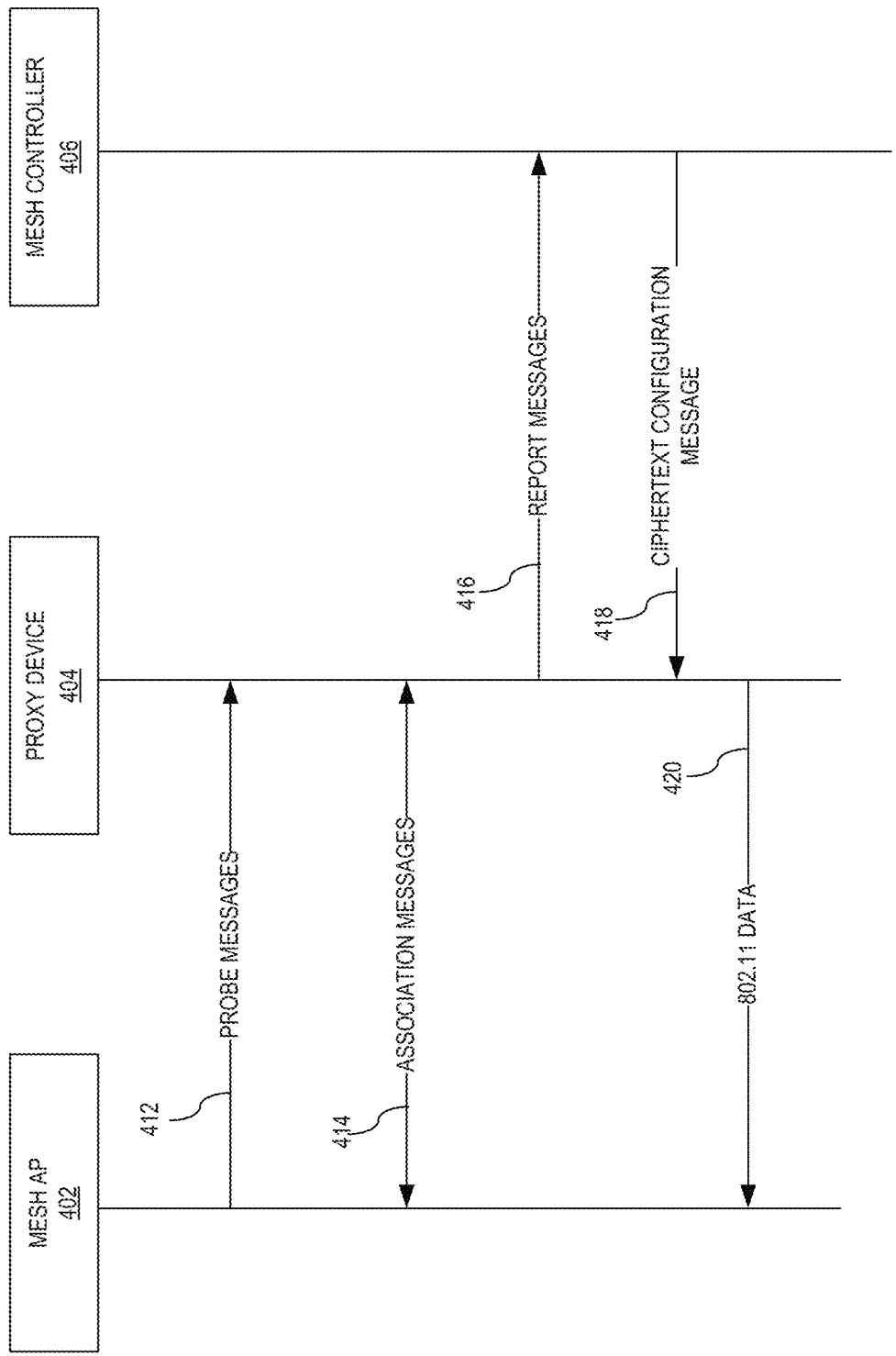
FIG. 4 illustrates a flow of messages for provisioning a mesh access point, according to one aspect.

FIG. 4 illustrates a flow of messages for provisioning a mesh access point, according to one aspect. During operation, a mesh AP 402 can start its booting process and can perform scanning by sending probe messages 412 via its radio. The scanning can be similar to the scanning defined by IEEE standard 802.11. However, unlike standard 802.11 scanning, mesh AP 402 can include its identity information (e.g., a MAC identifier, a manufacturer-assigned serial number, or a user-defined identifier) in each probe message.

Proxy device 404 is in the scanning range of AP 402 and can receive probe messages 412. According to IEEE standard 802.11, mesh AP 402 and proxy device 404 can exchange a few association messages 414 (e.g., open-system association request and response) to complete the association between proxy device 404 and mesh AP 402. Proxy device 404 can be configured to send report messages 416 to a mesh controller 406. In one example, proxy device 404 can simply forward the probe request from mesh AP 402 to mesh controller 406. The report messages can include the identity information of mesh AP 402.

Based on the report messages from proxy device 404, mesh controller 406 can determine that AP 402 needs provision and can encrypt a configuration message containing configuration parameters based on the identity information of mesh AP 402 included in the report messages. Mesh controller 406 can then send a ciphertext configuration message 418 to proxy device 404, causing proxy device 404 to forward the ciphertext configuration message as 802.11 data 420 to mesh AP 402. For example, proxy device 404 can read the message header to determine that this is a configuration message and identify a target AP and then forward the ciphertext configuration message to the target AP.

As can be seen from FIG. 4, the message flow between mesh AP 402 and mesh controller 406 is compact and simple. Other than the probe/association messages exchanged between proxy device 404 and mesh AP 402, there is no additional message exchange between mesh AP 402 and mesh controller 406. Before mesh controller 406 sends out the ciphertext configuration message, the only information exchanged is the identity information of mesh AP 402, thus making this process efficient. Note that the key generation and distribution can be performed offline before mesh AP 402 is deployed.

In the above discussions, the controller encrypts a configuration message to be sent to a particular AP using an AP-identifier-based private key, which is derived from the particular AP's identity information. In other words, for each to-be-provisioned AP, the controller needs to perform an AP-specific encryption operation, and the controller needs to send different encrypted messages to different APs. This can be problematic for large-scale networks that include a large number of APs. In a large-scale network, multiple APs may need to be provisioned/configured or reprovisioned/reconfigured at the same time. For example, multiple APs can be deployed at the same time; or multiple APs in the network may lose connection to the controller due to certain system failures and need to be rebooted and reconfigured. When multiple APs need to be provisioned at the same time, performing multiple encryption operations and sending multiple ciphertext messages can be a heavy burden for the controller. To further improve efficiency and reduce the controller load, according to some aspects of the application, the IBE-based scheme can be combined with the one-to-many encryption concept to create a novel identity-based-one-to-many encryption (IBOME) algorithm. The IBOME algorithm allows the controller to use a single encryption key (referred to as a group key) to perform encryption once for multiple APs. The same ciphertext configuration message can be sent to multiple to-be-provisioned APs, and each AP can decrypt the ciphertext using its own secret key.

To facilitate the IBOME operation, the KGMS can generate a public-private key pair for the controller, and the controller can generate, for each AP, a secret key, referred to as a controller-generated (CG) key. According to some aspects, the controller can generate a secret key for each AP using the controller's private key and the AP's identity information.

Figure 5:
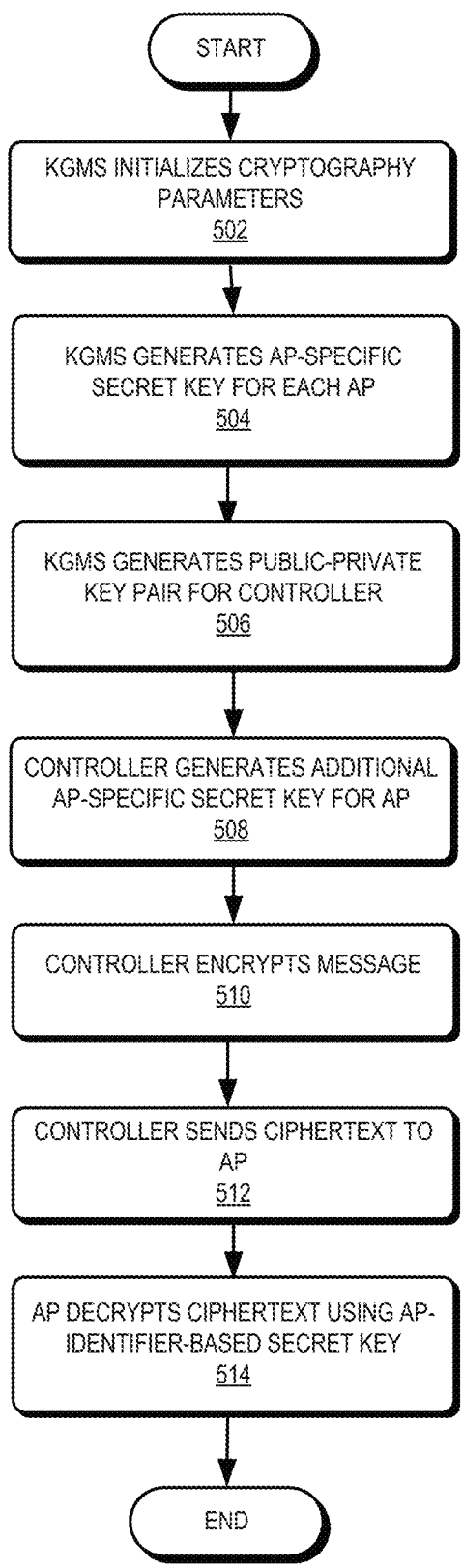
FIG. 5 illustrates a message-encryption/decryption process implementing identity-based-one-to-many encryption (IBOME), according to one aspect of the application.

FIG. 5 illustrates a message-encryption/decryption process implementing identity-based-one-to-many encryption (IBOME), according to one aspect. During operation, the KGMS can initialize cryptographic computing parameters used for subsequent encryption/decryption operations (operation 502). Operation 502 can be similar to operation 202 shown in FIG. 2, where the KGMS publishes the global system parameters that include the master public key. The KGMS can generate an AP-specific secret key (i.e., the AP-identifier-based secret key) for each AP using the master private key and the AP's unique identifier (operation 504). Operation 504 can be similar to operation 204, and the AP-specific secret key can be written to the ROM of the AP as part of the AP's manufacturing process.

The KGMS can further generate a public-private key pair for the controller (operation 506). The keys can be referred to as the controller public key and the controller private key. Exemplary pseudocode for the process of generating the controller public-private key pair can include:

KeyGen($AC_{id}$)://where $AC_{id}$ is the identifier of the controller
$SK_{AC}=\alpha \leftarrow_R Z_p$//where $SK_{AC}$ is the controller's private key;
$PK_{AC}=g_1^\alpha$//where $PK_{AC}$ is the controller's public key and $g_1$ can be obtained from the GSP.

The controller's public key $PK_{AC}$ can be added to the published GSP to send to all devices in the network.

Using the controller's private key, the controller can generate an additional AP-specific secret key for each AP based on the AP's identity information and distribute such keys to the APs (operation 508). Note that different from the previously mentioned AP-identifier-based secret key generated by the KGMS, this additional AP-specific secret key is generated by the controller and is referred to as a CG key. Exemplary pseudocode for the CG key generation process can include:

CGKeyGen($AP_{id}, M_{pk}, SK_{AC}$):
$Q_{id}=H_1(AP_{id})$//compute hash function;
$Z=Q_{id}^\alpha$;
$V=M_{pk}^\alpha = g_1^{a\Box s}$;
$X=\hat{e}(Z,M_{pk})=\hat{e}(Q_{id}^\alpha, g_1^s)$//apply bilinear mapping;
$CGKey_{Apid}=V \Box X= g_1^{a\Box s} \hat{e}(Q_{id}^\alpha, g_1^s)$//generate a CG key for a particular AP.

According to some aspects, the controller-generated secret key CGKey can be sent to each AP via the proxy device. Note that it is not required that CGKey be sent over a secure channel; CGKey can be sent via an open channel, as long as CGKey is not altered by the proxy device. According to alternative aspects, CGKey can be published by the controller to all devices in the network.

The controller can subsequently encrypt a message to be sent to multiple APs using a group key (operation 510). The group key can be a combination of the master public key and the controller public key, both of which are generated by the KGMS. In a system with multiple controllers, the same master public key can be used across the multiple controllers, and the controller public key can be controller-specific. Exemplary pseudocode for the message-encryption process can include:

Encrypt(M,$M_{pk}$, $PK_{AC}$):
$r \leftarrow_R Z_p$//randomly select an integer;
$U=\hat{e}(PK_{AC},M_{pk})^r$//apply bilinear mapping;
$CT=(C_1,C_2)=(g_1^r, M \oplus H_2(U))$//compute the two parts of the ciphertext.

The controller can send the same ciphertext CT to multiple APs via the proxy device (operation 512). Different APs in the network may use the same proxy device or different proxy devices to communicate with the controller. When an AP receives the encrypted message, it can use its own secret keys, including the pre-recorded AP-identifier-based secret key $SK_{id}$ and the controller-generated secret key CGKey, to decrypt the ciphertext to obtain the plaintext message (operation 514). Exemplary pseudocode for the ciphertext-decryption process can include:

Decrypt(CT, CGKey, $SK_{id}$):

$$V = \frac{CGKey_{APid}}{N} = \frac{g_1^{a\Box s} \hat{e}(Q_{id}^a, g_1^s)}{\hat{e}(Q_{id}^s, g_1^a)} = g_1^{a\Box s};$$

$$U = \hat{e}(PK_{AC}, M_{pk})^r = \hat{e}(g_1^a, g_1^s)^r;$$

$$\hat{e}(V, C_1) = \hat{e}(g_1^{a\Box s}, g_1^r) = U;$$

$$M' = H_2(\hat{e}(V, C_1)) \oplus C_2 = H_2(\hat{e}(V, C_1)) \oplus M \oplus H_2(U) = M.$$

Note that the message decryption is based on the bilinear property of the pairings $\hat{e}(SK_{id}, PK_{AC})=\hat{e}(Q_{id}^s, g_1^\alpha)$ and $U=\hat{e}(PK_{AC} M_{pk})^r = \hat{e}(g_1^\alpha, g_1^s)^r = \hat{e}(Q_{id}, g_1)^{a\Box r}$.

Compared with the process shown in FIG. 2, the encryption/decryption process shown in FIG. 5 includes additional key generation/distribution operations, which can include the KGMS generating the public-private key pair for the controller and the controller generating a secret key for each AP based on the controller's private key and each AP's identifier. These additional keys allow the controller to achieve one-to-many encryption using a group key, which can be a combination of the master public key and the controller public key.

Figure 6:
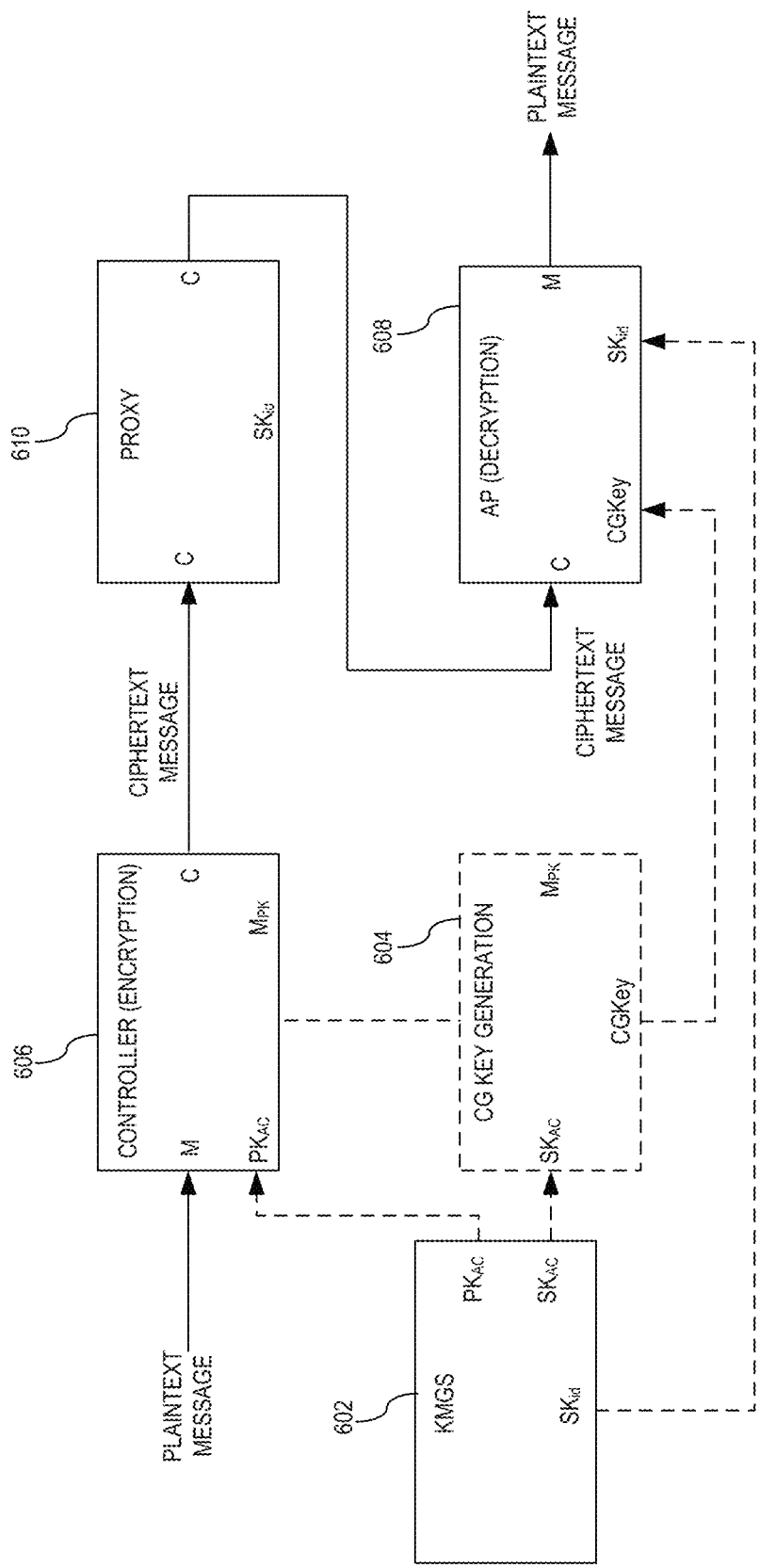
FIG. 6 illustrates a workflow of the identity-based-one-to-many encryption/decryption operation, according to one aspect of the application.

FIG. 6 illustrates a workflow of the identity-based-one-to-many encryption/decryption operation, according to one aspect. In FIG. 6, a KGMS 602 can perform the key-generation operations, which can include generating the AP-identifier-based secret key $SK_{id}$ for each AP and generating a public-private key pair $PK_{AC}$ and $SK_{AC}$ for the controller. A CG key generation unit 604 (which can be part of the controller) can generate a secret key CGKey for each AP based on the AP's identifier using the master public key $M_{pk}$ and the controller's private key $SK_{AC}$. CG key generation unit 604 can distribute the CGKey to each AP.

Using the master public key and the controller's public key, controller 606 can perform an encryption operation on a plaintext message to generate a ciphertext message. Controller 606 can send the ciphertext message to AP 608 via proxy 610. AP 608 can then use its pre-recorded APidentifier-based secret key $SK_{id}$ and the CGKey to decrypt the ciphertext message to obtain the plaintext message.

Compared with the workflow shown in FIG. 3, the workflow shown in FIG. 6 includes an additional element, CG key generation unit 604. According to some aspects, CG key generation unit 604 can be configured to generate the CGKey in response to the controller detecting one or more to-be-provisioned mesh APs (e.g., based on reports received from the proxy device). In a batch-deployment scenario, a system administrator may input identifiers of a larger number of APs into the controller to allow CG key generation unit 604 to generate the AP-specific secret keys for those APs in a batch and then distribute these keys separately to individual APs. According to some aspects, the CGKey can be sent to the APs via proxy device 610 or a public channel. For example, the CGKey can be sent to the AP during the association process (e.g., as part of the probe or association response) between the AP and the proxy device. Note that one cannot decrypt the ciphertext using the CGKey alone without the pre-recorded AP-identifier-based secret key $SK_{id}$, making it possible to send the CGKey over an open channel. In the event of an AP losing connection to the controller and needing reconfiguration, there is no need to regenerate and resend the CGKey. The AP can use the same CGKey received from the previous provision/configuration process to decrypt a newly received configuration message.

Figure 7B:
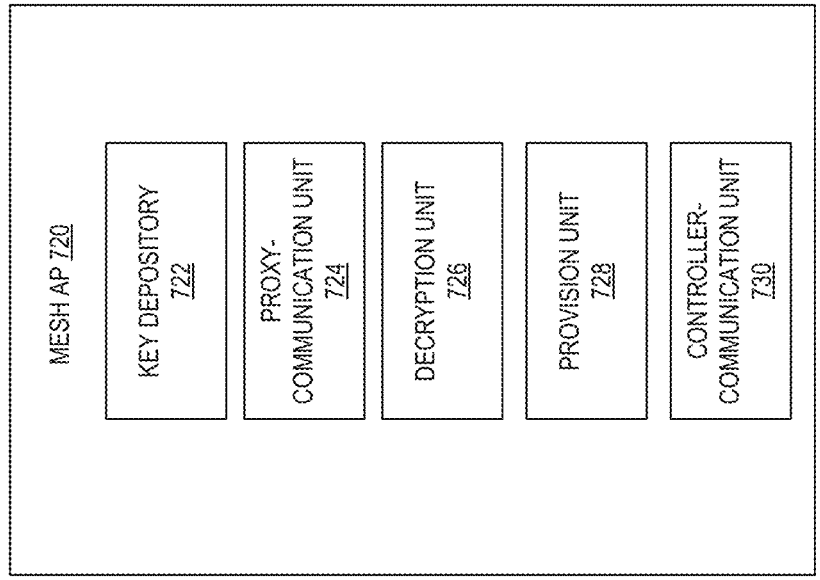
FIG. 7B illustrates a block diagram of a mesh access point (AP), according to one aspect of the application.
Figure 7A:
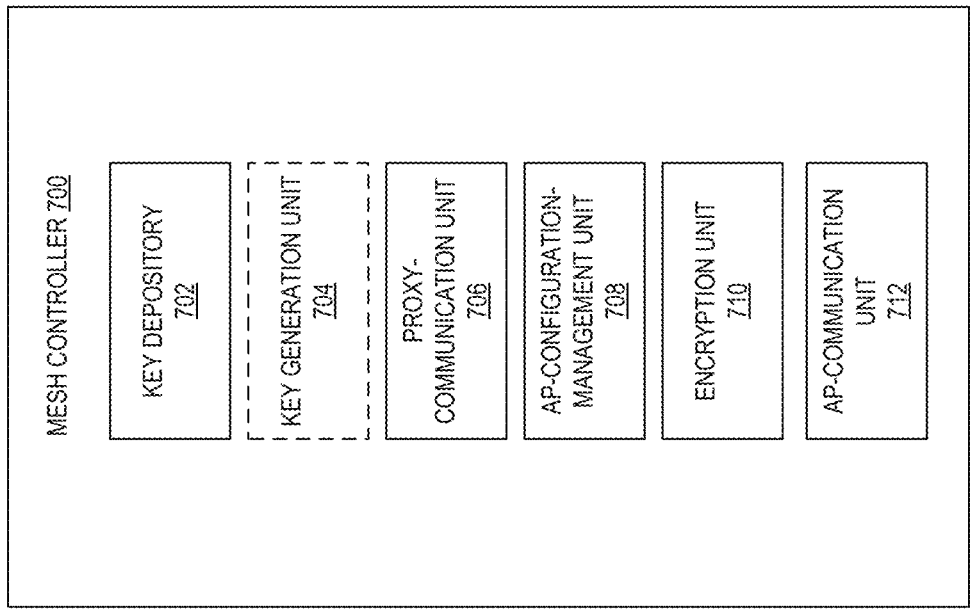
FIG. 7A illustrates a block diagram of a mesh controller, according to one aspect of the application.

FIG. 7A illustrates a block diagram of a mesh controller, according to one aspect. Mesh controller 700 can include a key depository 702, a key generation unit 704, a proxy-communication unit 706, an AP-configuration-management unit 708, an encryption unit 710, and an AP-communication unit 712. The various units in mesh controller 700 can be implemented using hardware, firmware, or software. In addition to the above units, mesh controller 700 can include additional units to facilitate operations other than AP provisioning, such as managing other aspects of the network and communicating with the wired LAN. The additional units may not pertain to the provision and/or configuration of mesh APs and are not described here.

Key depository 702 can store various encryption keys for mesh controller 700, including public keys as well as private keys. For example, key depository 702 can store master public key $M_{pk}$ and the controller public-and-private key pair $PK_{AC}$ and $SK_{AC}$. According to some aspects, mesh controller 700 can be coupled, via a network, to a centralized key generation and management system (KGMS), and key depository 702 can receive these keys from the KGMS.

Key generation unit 704 can be optional. Key generation unit 704 allows mesh controller 700 to implement the IBOME scheme to use a group key to encrypt a configuration message for multiple APs. However, it is possible that mesh controller 700 only implements the simple IBE scheme and uses different encryption keys for different APs. According to some aspects, key generation unit 704 can generate, for each AP, a secret key (i.e., CGKey) based on the AP's unique identifier. Such a secret key allows the AP to decrypt the configuration message encrypted using the group key. More specifically, CGKey for a particular AP can be generated based on the master public key, the private key of the controller, and the pre-recorded AP-identifier-based secret key of that particular AP. CGKey can be designed based on an ECC algorithm and bilinear pairing computation.

Proxy-communication unit 706 can facilitate the communication between mesh controller 700 and a proxy device that communicates with the to-be-provisioned AP(s). The proxy device has previously established a secure and trusted communication link to mesh controller 700 and is trusted to not tamper with messages exchanged between mesh controller 700 and the AP(s). Proxy-communication unit 706 can receive, from the proxy device, report messages that include to-be-provisioned APs' identifiers. Proxy-communication unit 706 can also send encrypted configuration messages to the proxy device to allow the proxy device to forward those messages to the to-be-provisioned APs.

AP-configuration-management unit 708 can set the configuration parameters (e.g., mesh cluster ID, AP radio power and frequency band, etc.) for the APs and generate configuration messages that include the configuration parameters. Encryption unit 710 can encrypt the configuration messages containing the configuration parameters. According to some aspects, encryption unit 710 can perform IBE by implementing an ECC algorithm and computing bilinear pairings. In such a situation, encryption unit 710 can use a master public key and an AP's unique identifier to generate an encrypted message specifically for that AP. According to alternative aspects, encryption unit 710 can perform IBOME by implementing an ECC algorithm and computing bilinear pairings. In such a situation, encryption unit 710 can use a group key (which can be a combination of the master public key and the controller's public key) to generate an encrypted message for all APs. AP-communication unit 712 can facilitate communications between mesh controller 700 and the AP(s) subsequent to the provisioning of the AP(s).

FIG. 7B illustrates a block diagram of a mesh access point (AP), according to one aspect. Mesh AP 720 can include a key depository 722, a proxy-communication unit 724, a decryption unit 726, a provision unit 728, and a controller-communication unit 730. The various units in mesh AP 720 can be implemented using hardware, firmware, or software. In addition to the above units, mesh AP 720 can also include additional units to facilitate other types of operations, such as providing connection services to client devices coupled the mesh AP 720.

Key depository 722 can store various keys needed for decrypting a received configuration message. The keys can include a pre-recorded AP-identifier-based secret key. This key is essential to the decryption operation and should be kept secure at all times. In situations where the mesh controller also generates a secret key CGKey for mesh AP 720, such a key can also be stored in key depository 722. Other than the secret keys, key depository 722 can also store global system parameters, which include the public keys and various cryptographic parameters needed for the decryption operation.

Proxy-communication unit 724 can facilitate the communication between mesh AP 720 and a proxy device. More specifically, proxy-communication unit 724 can send probe requests to the proxy device and exchange association messages with the proxy device. The probe message can include a unique identifier (e.g., a MAC identifier, a manufacturer-assigned serial number, or a user-defined identifier) of mesh AP 720. Proxy-communication unit 724 can also receive ciphertext configuration messages from the proxy device. Decryption unit 726 can decrypt a received ciphertext configuration message. If the configuration message is encrypted using IBE, decryption unit 726 can use the pre-recorded AP-identifier-based secret key to perform the decryption operation. If the configuration message is encrypted using IBOME, decryption unit 726 can use the pre-recorded AP-identifier-based secret key along with the controller-generated secret key CGKey to perform the decryption operation.

Provision unit 728 can provision mesh AP 720 using configuration parameters included in the decrypted configuration message. For example, provision unit 728 can set the power and frequency band of the radio on mesh AP 720. Once mesh AP 720 is provisioned, controller-communication unit 730 can facilitate the communication between mesh AP 720 and the mesh controller. For example, controller-communication unit 730 can receive updated configuration from the mesh controller.

Figure 8:
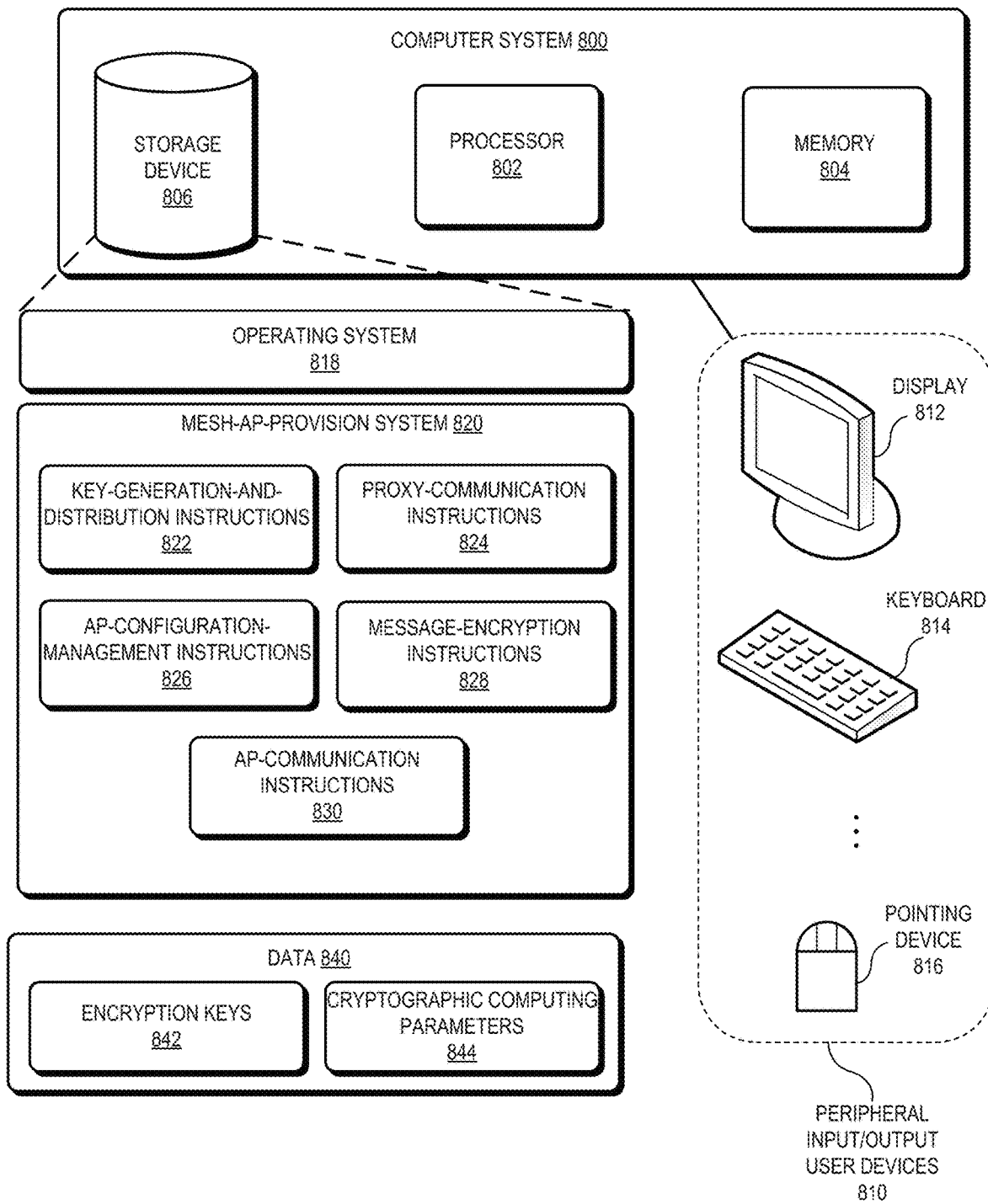
FIG. 8 illustrates a computer system that facilitates provisioning of mesh APs, according to one aspect of the application.

FIG. 8 illustrates a computer system that facilitates provisioning of mesh APs, according to one aspect of the application. Computer system 800 includes a processor 802, a memory 804, and a storage device 806. Furthermore, computer system 800 can be coupled to peripheral input/output (I/O) user devices 810, e.g., a display device 812, a keyboard 814, and a pointing device 816. Storage device 806 can store an operating system 818, a mesh-AP-provision system 820, and data 840. According to some aspects, computer system 800 can be part of a mesh controller.

Mesh-AP-provision system 820 can include instructions, which when executed by computer system 800, can cause computer system 800 or processor 802 to perform methods and/or processes described in this disclosure. Specifically, mesh-AP-provision system 820 can include instructions for generating and distributing various cryptographic keys (key-generation-and-distribution instructions 822), instructions for communicating with a proxy device (proxy-communication instructions 824), instructions for managing configurations of APs (AP-configuration-management instructions 826), instructions for encrypting configuration messages (message-encryption instructions 828), and instructions for communicating with APs (AP-communication instructions 830). Data 840 can include encryption keys 842 and cryptographic computing parameters 844.

In general, this disclosure provides a solution to the problem of provisioning mesh APs that do not have a wired connection to the mesh controller. A proxy device that has a previously established secure channel to the mesh controller can be used to facilitate message exchange between a mesh AP and the mesh controller during the booting stage of the mesh AP. To ensure security, an identity-based encryption (IBE) scheme can be used to encrypt configuration messages sent from the controller to the mesh AP via the proxy device. The IBE scheme can implement ECC and bilinear pairing computation. To reduce the load on the controller when provisioning multiple APs in a large-scale network, the IBE scheme can be enhanced using a one-to-many encryption technique to allow the mesh controller to use a group key for message encryption for all APs; upon receiving the same encrypted message, each AP can use its own identifier-based private key to perform decryption. Because the configuration messages are protected, the proposed mesh-AP-provision process is secure. Compared with the common public key infrastructure (PKI) schemes, IBE does not require an external license-management entity (e.g., a certificate authority), thus reducing the system complexity. Compared with other AP-provision techniques, this IBE-based provision technique only requires the AP's identity information to be exchanged between the AP and the controller, thus making the provision procedure efficient. The AP-provision efficiency can be further improved using IBOME that allows the controller to use a group key to encrypt the configuration message and send the same encrypted messages to multiple APs. This feature is especially valuable when a larger number of mesh APs lost connections to the controller and need to be reprovisioned or reconfigured.

One aspect can provide a system and method for provisioning an access point (AP) in a wireless mesh network. During operation, a controller can obtain a set of published global encryption parameters comprising a master public key, apply an identity-based encryption (IBE) scheme to encrypt a configuration message based at least on the master public key, and transmit the encrypted configuration message to a proxy device, which forwards the encrypted configuration message to the AP. The proxy device is communicatively coupled to the controller via a previously established secure communication channel and communicatively coupled to the AP via an open communication channel. The AP can decrypt the encrypted configuration message using an AP-specific secret key generated based on a unique identifier of the AP and a master private key corresponding to the master public key.

In a variation on this aspect, the unique identifier of the AP can include one of: a media access control (MAC) identifier, a manufacturer-assigned serial number, and a user-defined identifier.

In a variation on this aspect, the set of published global encryption parameters can further include a bilinear pairing mapping, and applying the IBE scheme can further include implementing a bilinear-pairing-based encryption scheme.

In a variation on this aspect, the AP-specific secret key can be pre-recorded in a read-only memory associated with the AP.

In a variation on this aspect, applying the IBE scheme can further include encrypting the configuration message based on the master public key and the unique identifier of the AP.

In a variation on this aspect, the controller can transmit, via the proxy device, a same encrypted configuration message to multiple different APs, and each AP of the multiple different APs can be configured to decrypt the same encrypted configuration message using a corresponding AP-specific secret key.

In a further variation, the controller can obtain a controller public-private key pair comprising a controller public key and a controller private key; generate, for each AP of the multiple different APs, an additional AP-specific secret key based on the controller private key and the AP's unique identifier; and distribute the additional AP-specific secret key to each AP of the multiple different APs.

In a further variation, applying the IBE scheme can further include encrypting the configuration message using a group key that comprises the master public key and the controller public key, thereby allowing each AP of the multiple different APs to decrypt the same encrypted configuration message using the corresponding AP-specific secret key and the additional AP-specific secret key.

One aspect can provide a system for provisioning access points (APs) in a wireless mesh network. The system can include a controller unit; a plurality of APs; a key-generation unit to generate a master public-private key pair for the system and generate, for a respective AP, an AP-specific secret key based on a unique identifier of the respective AP and a master private key of the master public-private key pair; and a proxy device communicatively coupled to the controller unit via a previously established secure communication channel and communicatively coupled to the respective AP via an open communication channel. The controller unit is to apply an identity-based encryption (IBE) scheme to encrypt a configuration message based at least on a master public key of the master public-private key pair. The proxy device is to forward the encrypted configuration message from the controller unit to the respective AP. The respective AP is to decrypt the encrypted configuration message using the AP-specific secret key, thereby facilitating provisioning of the respective AP based on the configuration message.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A method for provisioning an access point (AP) in a wireless mesh network, the method comprising:
   receiving, by a controller, a master public key from a key generation system, wherein the controller is separate from the AP;
   encrypting, by the controller using identity-based encryption (IBE), a configuration message based on the master public key, the configuration message comprising configuration parameters for the AP;
   transmitting the encrypted configuration message from the controller to a proxy device, wherein the proxy device is communicatively coupled to the controller via a previously established secure communication channel, and the proxy device is communicatively coupled to the AP via an open communication channel, and wherein the proxy device is an intermediary between the controller and the AP;
   forwarding, by the proxy device, the encrypted configuration message to the AP;
   storing, at the AP, an AP-specific secret key based on a unique identifier of the AP and a master private key of a master public-private key pair that further comprises the master public key;
   decrypting, by the AP, the encrypted configuration message using the AP-specific secret key to produce a decrypted configuration message, and
   applying, by the AP, the configuration parameters in the decrypted configuration message.

2. The method of claim 1, wherein the unique identifier of the AP comprises one of:
   a media access control (MAC) identifier,
   a manufacturer-assigned serial number, or
   a user-defined identifier.

3. The method of claim 1, wherein the IBE implements a bilinear-pairing-based encryption scheme.

4. The method of claim 1, wherein the AP-specific secret key is pre-recorded in a read-only memory associated with the AP.

5. The method of claim 1, wherein the IBE encrypts the configuration message based on the master public key and the unique identifier of the AP.

6. The method of claim 1, further comprising:
   transmitting, by the controller via the proxy device, the encrypted configuration message to multiple different APs, wherein each AP of the multiple different APs is configured to decrypt the encrypted configuration message using a corresponding AP-specific secret key.

7. The method of claim 1, further comprising:
   obtaining, by the controller, a controller public-private key pair comprising a controller public key and a controller private key;
   generating, for the AP, an additional AP-specific secret key based on the controller private key and the unique identifier of the AP; and
   sending the additional AP-specific secret key to the AP.

8. The method of claim 7, wherein the IBE encrypts the configuration message using a group key that comprises the master public key and the controller public key, and the AP decrypts the encrypted configuration message using the AP-specific secret key and the additional AP-specific secret key.

9. A system comprising:
   a controller;
   an access point (AP); and
   a proxy device,
   the AP configured to store an AP-specific secret key based on a unique identifier of the AP and a master private key of a master public-private key pair that further comprises a master public key,
   the controller configured to receive the master public key from a key generation system, wherein the controller is separate from the AP,
   the proxy device communicatively coupled to the controller via a previously established secure communication channel and communicatively coupled to the AP via an open communication channel, wherein the proxy device is an intermediary between the controller and the AP,
   wherein the controller is configured to:
      encrypt, using identity-based encryption (IBE), a configuration message based at least on the master public key, the configuration message comprising configuration parameters for the AP, and
      send the encrypted configuration message to the proxy device;
   wherein the proxy device is configured to forward the encrypted configuration message from the controller to the AP; and
   wherein the AP is configured to;
      decrypt the encrypted configuration message using the AP-specific secret key to produce a decrypted configuration message, and
      apply the configuration parameters in the decrypted configuration message at the AP.

10. The system of claim 9, wherein the unique identifier of the AP comprises one of:
a media access control (MAC) identifier,
a manufacturer-assigned serial number, or
a user-defined identifier.

11. The system of claim 9, wherein the IBE comprises a bilinear-pairing-based encryption.

12. The system of claim 9, wherein the key generation system is configured to pre-record the AP-specific secret key in a read-only memory associated with the AP.

13. The system of claim 9, wherein the IBE encrypts the configuration message based on the master public key and the unique identifier of the AP.

14. The system of claim 9, wherein the controller is configured to send, via the proxy device, the encrypted configuration message to a plurality of APs, wherein each AP of the plurality of APs is configured to decrypt the encrypted configuration message using a corresponding AP-specific secret key.

15. The system of claim 9,
wherein the key generation system is configured to generate a controller public-private key pair comprising a controller public key and a controller private key;
wherein the controller is configured to:
generate, for the AP, an additional AP-specific secret key based on the controller private key and the unique identifier of the AP, and
distribute the additional AP-specific secret key to the AP.

16. The system of claim 15, wherein the IBE encrypts the configuration message using a group key that comprises the master public key and the controller public key, and
wherein the AP is configured to decrypt the encrypted configuration message using the AP-specific secret key and the additional AP-specific secret key.

17. A non-transitory computer-readable storage medium storing instructions that when executed cause a system to:
receive, at a controller, a master public key;
encrypt, at the controller using identity-based encryption (IBE), a configuration message based on the master public key, the configuration message comprising configuration parameters for an access point (AP), wherein the controller is separate from the AP;
send the encrypted configuration message from the controller to a proxy device, which wherein the proxy device is communicatively coupled to the controller via a previously established secure communication channel and communicatively coupled to the AP via an open communication channel, and wherein the proxy device is an intermediary between the controller and the AP; and
forward, from the proxy device, the encrypted configuration message to the AP;
store, at the AP, an AP-specific secret key based on a unique identifier of the AP and a master private key of a master public-private key pair that further comprises the master public key;
decrypt, at the AP, the encrypted configuration message using the AP-specific secret key to produce a decrypted configuration message, and
apply, at the AP, the configuration parameters in the decrypted configuration message.

18. The non-transitory computer-readable storage medium of claim 17, wherein the IBE encrypts the configuration message based on the master public key and the unique identifier of the AP.

19. The non-transitory computer-readable storage medium of claim 17, wherein the instructions when executed cause the system to:
send, from the controller via the proxy device, the encrypted configuration message to multiple different APs, wherein each AP of the multiple different APs is configured to decrypt the encrypted configuration message using a corresponding AP-specific secret key.

20. The non-transitory computer-readable storage medium of claim 17, wherein the instructions when executed cause the system to:
receive, at the controller, a controller public-private key pair comprising a controller public key and a controller private key;
generate, at the controller for the AP, an additional AP-specific secret key based on the controller private key and the unique identifier of the AP;
send the additional AP-specific secret key from the controller to the AP,
wherein the IBE encrypts the configuration message using a group key that comprises the master public key and the controller public key.

* * * * *